C. C. FARMER.
PNEUMATIC CUT-OUT DEVICE.
APPLICATION FILED AUG. 7, 1920.
1,424,007.
Patented July 25, 1922.
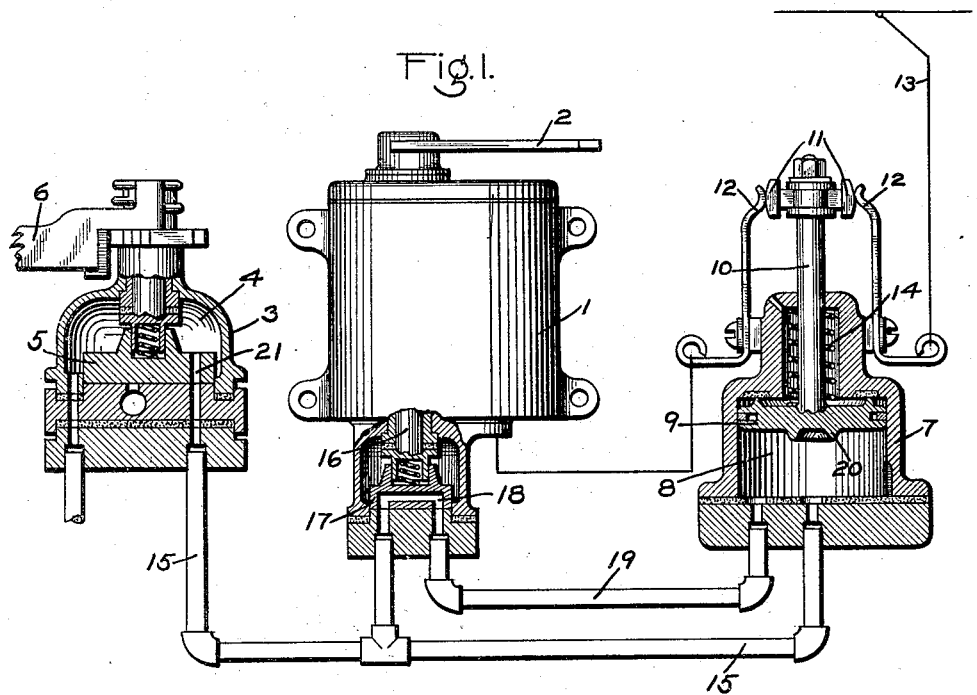
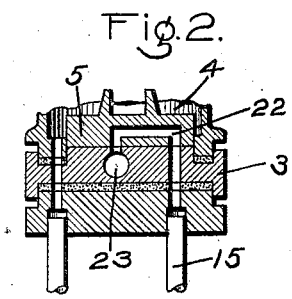
INVENTOR
CLYDE C. FARMER
BY Wm. M. Cady
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PNEUMATIC CUT-OUT DEVICE.

1,424,007.

Specification of Letters Patent.   Patented July 25, 1922.

Application filed August 7, 1920. Serial No. 401,896.

*To all whom it may concern:*

Be it known that I, CLYDE C. FARMER, a citizen of the United States, residing at Edgewood, in the county of Allegheny and State of Pennsylvania, have invented new and useful Improvements in Pneumatic Cut-Out Devices, of which the following is a specification.

This invention relates to car braking and power control equipments, and more particularly to a safety power cut-out device.

In the operation of electric traction cars, the power is occasionally lost by the trolley wheel leaving the trolley wire or otherwise, and in such cases, the operator will apply the brakes to bring the car to a stop, so that he can get off the car to replace the trolley wheel on the wire, but he may neglect to return the controller handle to off position, so that as soon as the trolley wheel has been replaced, power is supplied to the car motors and the car may start, in spite of the fact that the brakes have been applied.

The principal object of my invention is to overcome the above difficulty by providing improved means for preventing the supply of current to the car motors unless the brake valve is in release position and the controller is in off position.

In the accompanying drawing; Fig. 1 is a view, partly in section, of a car control equipment with my invention applied thereto; and Fig. 2 a sectional view of the brake valve device in a position other than release position.

The construction shown in the drawing comprises an electric power controller 1 having an operating handle 2, a brake valve device 3, having a valve chamber 4 containing a rotary valve 5 adapted to be operated by handle 6, and a pneumatic switch device 7, having a piston chamber 8 containing a piston 9.

The stem 10 of piston 9 carries connected contacts 11 adapted to bridge fixed contacts 12 for closing the power circuit from the trolley 13 to the controller 1. A spring 14 acts on one side of piston 9 and tends to shift the piston in a direction for opening the power circuit and the piston chamber 8 at the opposite side is connected to a pipe 15, leading to the seat of the rotary valve 5.

Operatively connected to the controller shaft 16 of the power controller is a rotary valve 17 having a cavity 18, adapted in the off position of the controller to connect an additional pipe 19, leading from piston chamber 8, to the pipe 15.

The pipe 15 opens into piston chamber 8 at the central portion and the piston 9 is provided with a central seating ring 20 which is adapted, when the piston is in its lowermost position, to seal off the pipe 15, so that any pressure in pipe 15 then acts only on the restricted seated area of the piston.

In the release position of the brake valve device 3, a port 21 in the rotary valve 5 registers with the pipe and passage 15 and in other positions of the brake valve, as shown in Fig. 2 of the drawing. a cavity 22 connects the pipe 15 with an exhaust port 23.

In operation, with the brake valve in release position and the controller handle 2 in off position, fluid under pressure is supplied from the brake valve through port 21 to pipe 15 and flows to the piston chamber 8 both through the direct connection and through cavity 18 in valve 17 and pipe 19.

The piston 9 is then shifted to its outer position, closing the power circuit through the switch contacts 11 and 12, as shown in Fig. 1.

So long as the brake valve 3 remains in release position, the piston 9 will be maintained in the circuit closing position, and the controller 1 may be operated in the usual manner, to supply current to the car motors for propelling the car.

If the brake valve is moved from release position to apply the brakes, the pipe 15 is connected through cavity 22 with exhaust port 23, so that fluid under pressure is vented from piston chamber 8 and piston 9 is then operated by the spring 14 to open the switch contacts.

It will now be seen that if the trolley wheel should leave the wire and the operator should apply the brakes to stop the car, the power circuit to the controller will be opened, so that even if he leaves the car to replace the trolley with the controller in a power-on position, current will not be supplied to the car motors when the trolley wheel is replaced.

When he returns to the car, if he should return the brake valve to release position, leaving the controller in a power-on position, the car would not start, since the pipe 19 is closed in the power positions of the controller and fluid under pressure supplied to the area of piston 9 enclosed by the seating ring 20 will not be sufficient to lift the piston.

In order to start, the operator must move the controller to off position as well as the brake valve to release position, so that fluid under pressure can be supplied through cavity 18 and pipe 19 to substantially the full area of piston 9. Fluid supplied to piston chamber 8 through pipe 19 then operates to shift piston 9 to its upper position for closing the power circuit.

Thereafter, the controller may be operated through its power positions, since the piston 9 can now be held in its upper position by fluid supplied to piston chamber 8 directly through pipe 15, so long as the brake valve remains in release position.

Having now described my invention, what I claim as new and desire to secure by Letters Patent, is:—

1. The combination with a controller and a brake valve, of a fluid pressure operated switch device for controlling the power circuit to the controller and means controlled by said controller for controlling a communication through which fluid under pressure is supplied from the brake valve to said switch device.

2. The combination with a controller and a brake valve, of a fluid pressure operated switch device for controlling the power circuit to the controller and a valve operated by said controller and adapted in the off position of the controller to establish communication for supplying fluid under pressure from the brake valve to said switch device.

3. The combination with a controller and a brake valve, of a fluid pressure operated switch device for controlling the power circuit to the controller and adapted to be supplied with fluid under pressure from the brake valve through one communication and a valve operated upon movement of the controller for opening another communication from the brake valve to said switch device.

4. The combination with a controller of a fluid pressure operated switch device for controlling the power circuit to the controller and normally subject to fluid under pressure for holding the power circuit closed and a brake valve having a brake applying position and ports for venting fluid from said switch device to thereby permit the operation of same to effect the opening of the power circuit.

5. In a brake and power control apparatus, the combination with a controller, of a switch for controlling the power circuit to said controller, a piston for operating same and having two areas separated in the seated position of the piston by a seat, a brake valve for supplying fluid under pressure to one area, and means controlled by the controller for supplying fluid under pressure to the other area.

6. In a brake and power control apparatus, the combination with a controller, of a fluid pressure operated switch for controlling the power circuit to said controller, a brake valve for supplying fluid under pressure to said switch device in release position. and means operative in the off position of the controller for also supplying fluid under pressure to said switch device.

7. In a brake and power control apparatus, the combination with a controller, of a fluid pressure operated switch for controlling the power circuit to said controller, a brake valve for supplying fluid under pressure to said switch device in release position and for venting fluid under pressure from said switch device in the brake applied positions of the brake valve, and a valve operated by said controller for supplying fluid under pressure to said switch device only in the off position of the controller.

8. The combination with a controller, of a switch device operated by fluid under pressure for controlling the power circuit only to said controller, a brake valve adapted only in release position to supply fluid under pressure to said switch device, and a valve operated by said controller in off position only for opening communication through which fluid is supplied from the brake valve to said switch device.

In testimony whereof I have hereunto set my hand.

CLYDE C. FARMER.